Figure 1:
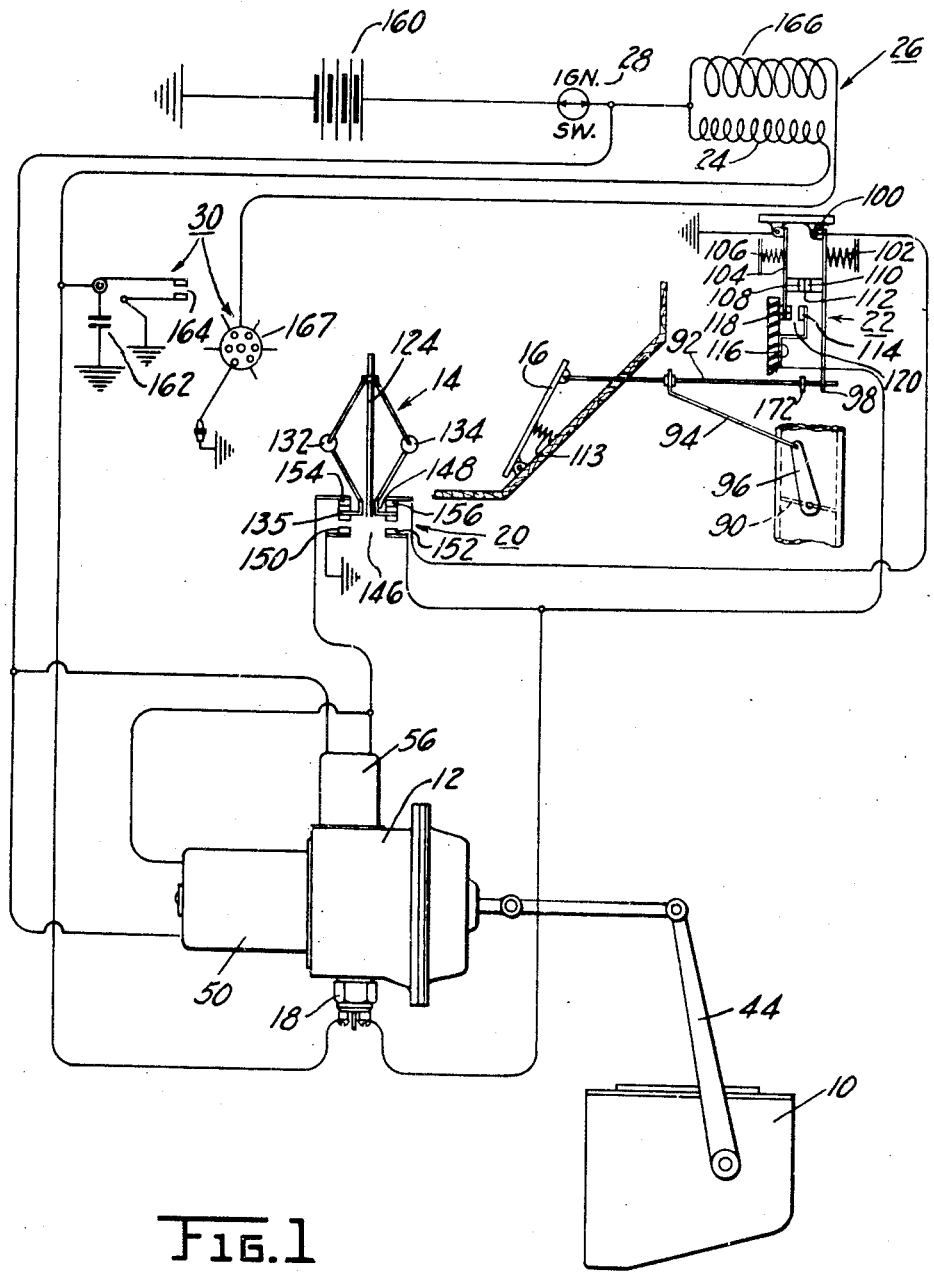

Aug. 30, 1949.   H. W. PRICE   2,480,768
FLUID PRESSURE OPERATED MOTOR AND SWITCH
Original Filed Nov. 13, 1940   2 Sheets-Sheet 1

INVENTOR
HAROLD W. PRICE
BY
H. V. Clayton
ATTORNEY

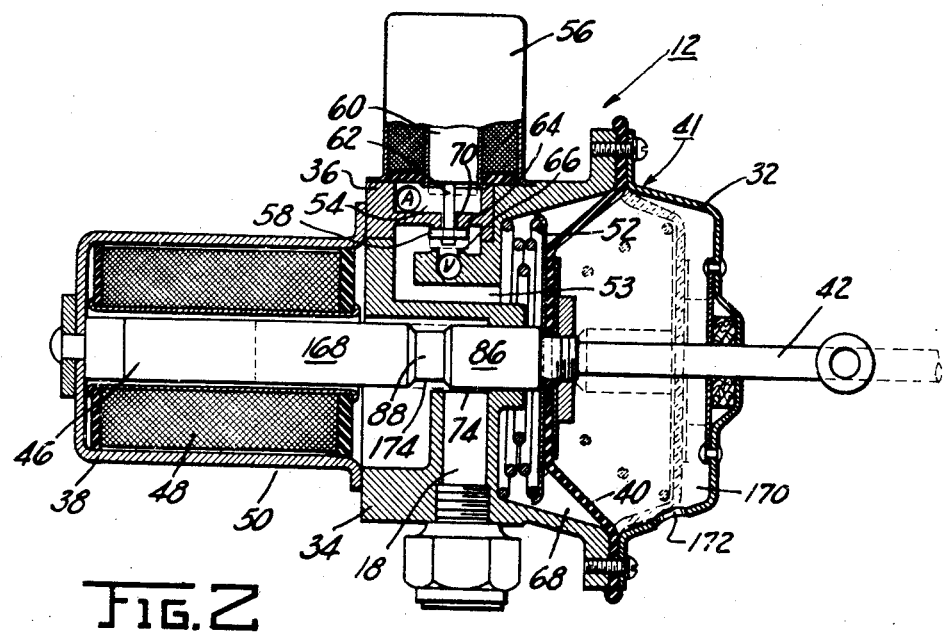

Patented Aug. 30, 1949

2,480,768

UNITED STATES PATENT OFFICE 2,480,768

FLUID PRESSURE OPERATED MOTOR AND SWITCH

Harold W. Price, Bradenton, Fla., assignor to Bendix Aviation Corporation, South Bend, Ind., a corporation of Delaware Original application November 13, 1940, Serial No. 365,413. Divided and this application March 24, 1945, Serial No. 584,647

2 Claims. (Cl. 200—83)

This invention relates to motors and more particularly to the spring and pressure differential operated motor unit of the so-called kickdown transmission mechanism which constitutes a part of the power plant of certain 1941 model cars. This transmission mechanism, which is similar in general to that disclosed in the U. S. patent to Matulaitis No. 2,296,646 dated September 22, 1942, includes a transmission operating crank which is moved to its upshift position by the vacuum operation of the spring and pressure differential operated motor of said mechanism and to its kickdown position by the operation of the spring of said motor. As disclosed in the aforementioned patent the motor of the kickdown mechanism is controlled by a solenoid and spring operated three-way valve and the power element of said motor is held in its upshift position by the combined effect by a differential of gaseous pressures and a latch mechanism.

Now the kickdown motor of my invention, which incidentally is disclosed in my parent application Serial No. 365,413, filed November 13, 1940, now Patent No. 2,440,558, granted April 27, 1948, constitutes an improvement over the above described type of motor by virtue of its simplicity; for in the motor of my invention there is no latch mechanism and the armature of an electromagnet serves to hold the power element of the motor in its upshift position.

A further object of my invention is to provide a simple, compact and effective spring and pressure differential operated motor unit for use in the so-called kickdown transmission mechanism of the day, said motor unit including electromagnetic means for operating the control valve constituting a part of the motor unit and for holding the power element of said unit in its upshift position.

Other objects of the invention and desirable details of construction and combinations of parts will become apparent from the following description of a certain embodiment, which description is taken in conjunction with the accompanying drawings, in which:

Figure 1 is a diagrammatic view disclosing a transmission operating kickdown mechanism, said mechanism including the motor unit constituting my invention; and Figure 2 is a longitudinal sectional view of the transmission operating and ignition controlling motor unit constituting my invention.

Referring to Figure 1 of the drawing diagrammatically disclosing a transmission operating kickdown mechanism including the motor unit constituting my invention, the reference numeral 10 indicates a power operated two-speeds forward selective gear transmission mechanism which may be placed ahead of or to the rear of a manually operated selective gear or so-called step type of transmission in the power transmission mechanism of an automotive vehicle; or this power operated transmission may be combined with the manually operated transmission as a single transmission unit. The manually operated step transmission may be omitted and the transmission 10, modified to include a manually operated reverse gear, may be combined with the rear axle mechanism of the vehicle to provide what is known in the art as a two-speed rear axle. If a manually operated step transmission is incorporated in the transmission system, then a manually or power operated friction clutch may be included in said system.

The transmission 10 includes a drive shaft and a driven shaft, not shown, and should said transmission be placed ahead of a manually operated transmission, not shown, then the drive shaft is connected to a clutch, not shown, and the driven shaft is connected to the drive shaft of the manually operated transmission. Should the transmission 10 be placed to the rear of a manually operated transmission, then the drive shaft of the transmission 10 is connected to the driven shaft of the latter transmission and the driven shaft of the transmission 10 is connected to the propeller shaft of the vehicle.

The so-called transmission operating kickdown mechanism of Figure 1 is controlled either by the throttle controlling means of the vehicle or by a vehicle speed-responsive governor, depending upon the particular operation desired, said power means serving to operate any type of transmission that will alternately effect an increase and a decrease of the speed ratio between the engine and the driving ground wheels of the vehicle. The kickdown mechanism of Figure 1 also serves to, in part, control the operation of the engine controlling ignition system to facilitate the operation of the change-speed transmission by said power means. It follows, therefore, that it is within the purview of my invention to employ a two-speeds forward planetary transmission. However, I prefer to employ a selective gear type of two-speeds forward transmission cooperating with a manually operated selective gear transmission, a fluid clutch and a friction clutch, the two clutches and manually operated transmission being interposed between the engine and the first mentioned transmission in the power transmitting mechanism of the vehicle.

It is particularly desirable that the transmission operating and ignition controlling power means of Figure 1 be incorporated in an automotive vehicle equipped with a fluid coupling type of clutch for transmitting the drive from the internal-combustion engine of the vehicle to the change-speed transmission mechanism. Such a clutch, which is well known to those skilled in this art, constitutes a yieldable connection between the engine and the drive shaft of the change-speed transmission and at all times during the operation of the engine serves as a force-transmitting medium. Inasmuch as the clutch will slip until the speed ratio of the rotor and stator elements of the clutch is 1 to 1 and inasmuch as with such a clutch there is no clutch disengaging operation to be effected, it follows that the fluid clutch will facilitate an operation of the selective change-speed transmission mechanism to the rear of the clutch and it also follows that such a mechanism may be simplified by reducing the number of driving ratio settings thereof. Accordingly, the change-speed transmission of the vehicle may be limited to the simple two-speed selective gear transmission 10 disclosed in Figure 1. However, to facilitate a starting of the vehicle when the same is, say, mired in soft ground or when, for any other reason, the load to be driven is relatively heavy, the transmission 10 may, as heretofore mentioned, be supplemented by a friction clutch and the aforementioned selective gear transmission mechanism, the latter being manually operated to select a relatively low speed ratio between the engine and the vehicle driving wheels or propeller shaft. Such a manually operated supplemental selective transmission may, after the friction clutch is disengaged, be operated to place the transmission in neutral, that is, disconnect the engine or other prime mover from the driving ground wheels. Such a neutral setting, in a vehicle provided with a fluid clutch, will obviate an undesired creeping of the vehicle after it has been brought to a stop and will also obviate a possible stalling of the engine should the viscosity of the oil or other power-transmitting medium of the clutch be unduly increased by cold weather.

Describing now the transmission operating and ignition controlling power means disclosed in Figure 1, said means includes my invention, that is a spring and pressure differential operated motor and valve unit 12; and said unit is controlled by a vehicle speed-responsive governor 14 and by the accelerator 16 of the vehicle. As will be described hereinafter, a motor operated so-called ignition interrupter switch 18, a two-part governor operated switch mechanism 20, an accelerator operated two-part switch mechanism 22, and wiring interconnecting said switch mechanisms with the primary winding 24 of an ignition coil 26 and with an igniton switch 28, constitute electrical means operative to successively cut out and cut in a distributor 30 as a so-called kick-down or step-down operation of the transmission is being effected. The ignition coil and distributor constitute two of the principal parts of the engine controlling ignition system, which is of conventional design.

The accelerator 16 of the vehicle is operably connected to the throttle valve or so-called butterfly 90 of the carburetor by force transmitting means including links 92 and 94 and a crank 96. One end of the link 92 is slidably mounted within the end of a lever 98 fulcrumed at 100 and biased to the left, Figure 1, by a relatively heavy spring 102. A lever 104 which is wired to ground is biased to the right, Figure 1, by a relatively light spring 106 which is weaker than the spring 102. Contacts 108 and 110 are secured respectively to the levers 104 and 98 and together constitute one of the switches of the accelerator operated switch mechanism 22. This switch, which is grounded, is indicated by the reference numeral 112. The spring 102, being stronger than the spring 106 maintains the contacts 108 and 110 in abutment to close the switch 112 when, as disclosed in Figure 1, the accelerator is returned to its throttle closed position by a spring 113. A contact 114, secured to a support 116 of insulating material, together with a contact 118 secured to one end of the lever 104, constitutes the other of the two switches operated by the accelerator and this latter switch is, as disclosed in Figure 1, open when the accelerator is released. This switch is indicated by the reference numeral 120.

The switch operating flyball governor 14 disclosed in Figure 1 is of a standard design, accordingly, said governor is not shown in detail. Suffice it to say that upon rotation of a pin 124 centrifugal weights 132 and 134 are subjected to a force effecting an angular movement of said weights thereby forcing a movable contact member 135 upwardly to first open a lower switch 146 and then close an upper switch 148, said switches being diagrammatically disclosed in Figure 1. Switch 146 includes a grounded contact 150 and a contact 152 and switch 148 includes contacts 154 and 156, both switches having an element in common, that is, the aforementioned movable contact member 135. The above described opening and closing operation of the switch mechanism 20 occurs at, say, a vehicle speed of five miles per hour; however, said mechanism may be adjusted to operate at a different speed.

Describing now the aforementioned ignition controlling electrical means, the interrupter switch 18 is wired in series with primary winding 24 of the ignition coil 26 and with the switch 120 of the grounded accelerator operated switch mechanism. The distributor 30 of the ignition system includes, of course, a grounded condenser 162, a breaker switch 164 and a rotor 167 wired to the several grounded spark plugs, only one of which is disclosed. As disclosed in Figure 1, the interrupter switch 18 is also wired in series with the switch 146 of the governor operated switch mechanism 20. Completing the description of the conventional ignition system disclosed in Figure 1, the primary winding 24 of the ignition coil 26 is wired in series with the ignition switch 28 and the breaker switch 164 of the distributor; and a secondary winding 166 of the ignition coil is wired in series with the rotor 167 and said ignition switch.

Referring to Figure 2 of the drawings, disclosing in detail the motor and valve unit 12, the same includes a multi-sectioned casing including parts 32, 34, 36 and 38 housing a flexible diaphragm 40, constituting the power element of a pressure differential and spring operated double-acting motor described in greater detail hereinafter and indicated by the reference numeral 41. To this diaphrgam 40 there is secured a connecting rod 42 connected at its end to a crank 44, Figure 1, which actuates the transmission 10. A switch operating rod 46 is secured to said diaphragm and connecting rod and extends within a winding 48. That portion of the rod 46 which extends within the winding 48 constitutes an armature, the armature and winding together constituting a solenoid indicated as a whole by the reference numeral 50. A relatively heavy spring 52, interposed between the casing part 34 and the diaphragm 40, serves to move the diaphragm and the crank 44 connected thereto to the right to establish the transmission in its low gear setting, all of which will be described in detail hereinafter.

The casing parts 34 and 36 are recessed to provide compartments 53 and 54 and a valve operating solenoid 56 is fixedly mounted upon said casing parts. A valve 58 is connected to the armature 60 of the solenoid 56 by a pin 62, said valve being seated upon either seat 64 or seat 66. If the solenoid 56 is energized the valve 58 is moved to the full line position disclosed in Figure 2 upon its seat 64 thereby interconnecting the intake manifold of the engine or other source of vacuum with a compartment 68 of the motor 41 via the compartment 53 and a duct V connected at one of its ends with a conduit, not shown, leading to said vacuum source. The valve 58 is then in its so-called open position. If the solenoid 56 is deenergized the valve 58 is moved by a spring, not shown, biasing the armature 60 and the valve connected thereto to the position disclosed in dotted lines in Figure 2. The valve is then seated upon seat 66 and is said to be closed. The compartment 68 of the motor 41 is then vented to the atmosphere via the compartment 53, an opening 70 in the casing part 36, the compartment 54 and a duct A bored in said casing part. The casing part 32 and a portion of the casing part 34 together with the diaphragm 40 and the spring 52 constitute the aforementioned single-acting motor 41, said motor being controlled by the above described valve mechanism, the operation of which will be described in greater detail hereinafter. This valve mechanism may be termed a three-way mechanism, inasmuch as the valve 58 controls the air transmitting passages connected to the atmosphere, the source of vacuum and the motor 41.

The grounded accelerator operated switch 112 is wired in series with the governor operated switch 148, the valve operating solenoid 56 and the ignition switch 28 of the vehicle, the latter being wired to a battery 160. Accordingly, the accelerator operated switch 112 and the governor operated switch 148 constitute the means for controlling the operation of the valve operated solenoid 56, said solenoid being energized to move the valve 58 to its open position when the accelerator is released and the speed of the vehicle is sufficiently high to close the switch 148.

Describing now the operation of the mechanism disclosed in the drawings and incidentally completing the description of the details thereof, when the vehicle is at a standstill the transmission 10 is automatically placed in its low gear setting. The interrupter switch 18 is at this time open, for the diaphragm 40 of the motor 41 is in the dotted line position disclosed in Figure 2 and a full bodied portion 168 of the switch operating rod 46 is in contact with a switch operating member 74 to depress the same. The diaphragm 40 takes this position at this time because the valve 58 is then in its closed position as disclosed in dotted lines in Figure 2; accordingly, the compartment 68 of the motor 41 is vented to the atmosphere. Explaining the fact that the valve 58 is closed, it is to be noted that the valve operating solenoid 56 is deenergized when the car is at a standstill; for the governor operated switch 148 is then opened, thereby breaking the circuit to ground said solenoid. Now when the motor compartment 68 is vented to the atmosphere the spring 53 expands to move the diaphragm 40 to the right, Figure 2, thereby actuating the crank 44 and placing the transmission 10 in low gear.

Assuming now that the driver of the car desires to get under way, all that is required of him is to depress the accelerator, assuming of course, that the engine is idling. The car then moves forwardly, the acceleration depending of course upon the degree of depression of the accelerator. If, as suggested supra, the car is equipped with a manually operated three speeds forward and reverse transmission and a fluid clutch, then the driver may, prior to starting the vehicle in motion, place said transmission in high gear, for the then existing low gear setting of the transmission 10 coupled with the operation of the fluid clutch makes it possible to effect a smooth start when the manually operated selective transmission is in high gear. Thereafter, under all normal driving conditions, there is no need to change this setting of the manually operated transmission.

Continuing the description of the operation of the mechanism disclosed in the figures of the drawing, when the desired speed of the vehicle is reached the driver then, of course, releases the accelerator. The throttle is thus moved toward its closed position and when the same is, say, three-fourths closed there is created sufficient vacuum in the intake manifold of the car to make possible an energization of the motor 41 to place the transmission 10 in its high gear setting. However, in order to effect this energization it is necessary to open the valve 58 to the position disclosed in full lines in Figure 2 and this is accomplished by releasing the accelerator sufficiently to permit the spring 102 to open the switch 120 and close the switch 112. Closing of the switch 112 completes the electrical circuit to energize the valve operating solenoid 56, assuming that the speed of the vehicle exceeds the aforementioned predetermined speed of five miles per hour, for the governor 14 then functions to close switch 148 and open switch 146. Now when the solenoid 56 is energized the valve 58 is as stated above, moved to the position disclosed in full lines in Figure 2, thereby cutting off the air transmitting connection between the compartments 53 and 54 and completing an air transmitting connection between the manifold or other source of vacuum and the compartment 68 of the motor 41 via the compartment 53, duct V and the conduit, not shown, connecting said duct with the source of vacuum.

The motor compartment 68 having been connected to the partially evacuated manifold is immediately partially evacuated, thereby initiating a movement of the diaphragm 40 to the left, Figure 2, to place the transmission 10 in its high gear setting. Completing the description of this operation, a compartment 170 of the motor 41 is at the time vented to the atmosphere via an opening 172 in the casing part 32. The diaphragm 40 is thus subjected to a differential of pressures and the resulting load effects the aforementioned movement of the diaphragm to the left to move the connecting rod 40 and rotate the crank 44 to place the transmission 10 in its high gear setting.

When the accelerator is released to effect the high gear setting of the transmission, the torque or driving force of the engine is appreciably reduced and this reduction facilitates the demeshing of the gears establishing the second speed setting of the transmission 10. This reversal of torque also facilitates the operation of meshing the gear teeth of the transmission 10 to establish said transmission in high gear. A free wheeling unit may be incorporated in the power transmission mechanism to the rear of the change-speed transmission or transmission and such a unit will also facilitate the aforementioned gear changing operations. Furthermore, the fluid clutch will aid in these operations.

Now, it is necessary to maintain the diaphgram 40 in the vacuum operated position disclosed in full lines in Figure 2, for otherwise, upon depressing the accelerator short of a position to open the switch 112 the manifold vacuum might drop sufficiently to effect an undesired movement of the diaphragm to the right, Figure 2, by the spring 52 with a resultant setting of the transmission 10 in low gear. To prevent this operation there is provided the solenoid 50 which functions, when energized, as a holding means to maintain or load the diaphragm 40 in its high gear position thereby supplementing the then existing differential of pressures tending to hold said diaphragm in said position. Referring now to Figure 1 it will be noted that when the governor 14 is operative to close the switch 148, that is when the car speed is above five miles per hour, and when the accelerator has been released sufficiently to close the switch 112 then the solenoid 50 is energized and so long as it remains energized it holds the diaphragm 40 in its high gear position. As disclosed in Figure 1 the diaphragm holding solenoid 50 is wired in parallel with the valve operating solenoid 56 in the circuit interconnecting the ignition switch 28, the battery 160, the governor operated switch 148 and the accelerator operated switch 112.

There is thus provided power means, that is, the solenoid 50 or its equivalent, operative to insure a high gear setting of the transmission 10 until either the speed of the vehicle is decreased below a predetermined factor or the accelerator is depressed sufficiently to open the switch 112 and permit a closing of the switch 120. The incorporation of this power means in the motor unit constitutes one of the most important features of my invention.

The high gear setting of the transmission 10 having been established by releasing the accelerator sufficiently to energize the motor 41 by vacuum, the driver will then depress the accelerator to maintain or increase the speed of the vehicle. However, as described above, the diaphragm 40 and linkage connected thereto will not be power operated by the spring 52 to again place the transmission 10 in low gear until the accelerator is sufficiently depressed to effect a closing of the switch 120. We will now assume that the vehicle is driven into hilly country and the driver fully depresses the accelerator in order to increase the driving torque of the engine and thereby maintain a relatively high vehicle speed or increase the speed of the vehicle to make it unnecessary to shift gears. As to the latter operation, it is assumed that a manually operated two-speeds forward and reverse transmission is combined with the automatically operated two-speed forward transmission 10 disclosed in Figure 1. Now, obviously, it is best not to so unduly tax the engine, and with the mechanism of my invention such an operation is unnecessary; for upon depressing the accelerator to open the switch 112 and close the switch 120, the transmission 10 is automatically operated to lower the driving ratio between the engine and the driving wheels of the vehicle, that is, establish the low gear setting of the transmission. If the vehicle is also equipped with a manually operated transmission, this operation of the transmission 10 makes it unnecessary to shift the gears of the manually operated transmission.

Describing this operation, when the accelerator is almost fully depressed a stop 172 fixedly mounted on the link 92 moves into contact with the end portion of the lever 98. Accordingly, the final increment of the thottle opening movement of the accelerator serves to open the switch 112 and permit the spring 106 to close the switch 120, thereby again deenergizing the solenoids 50 and 56. The armature 60 of the solenoid 56 is thus again moved downwardly by the spring, not shown, and the valve 58 is moved to its seat 66 to the position disclosed in dotted lines in Figure 2. As previously described, this operation results in a venting of the motor compartment 68 to the atmosphere.

The venting of the compartment 68 and the deenergization of the solenoid 50 will permit the compressed spring 52 to again move the diaphragm 40 to the right, Figure 2, to again establish the transmission 10 in its low gear setting.

Describing now another feature of my invention, that is the cycle of operations effected by the expanding of the spring 52 as a power means, during the first increment of movement of the spring operated diaphragm, the lost motion in the force transmitting linkage interconnecting the diaphragm and the transmission gears is taken up. It is, of course, true that all such linkage including that within the transmission is subject to appreciable wear and tear resulting in lost motion between the several parts thereof, and there is always some lost motion in this linkage when the original installation is made despite every effort to make a tight fit. As this lost motion is being taken up the switch operating rod 46 is being moved to the right, Figure 2, until the member 74 is positioned immediately adjacent the small bodied portion 88 in said rod. This portion provides a recess 174 receiving the switch operating member 74. Now, when this rod has moved sufficiently to register the recess 174 with the member 74, then the switch 18 is closed. The construction and arrangement of the parts, including the depth and length of the recess 174 and the position of the member 74 within the recess when the diaphragm 40 is being held by the solenoid 50 in its vacuum operated position, are such as to insure a closing of the switch 18 at substantially the same time that the demeshing movement of the transmission gear teeth is initiated. Now, when the switch 18 is closed, the electrical ground connection to the switch 120 is completed, for at this time the driver is maintaining said switch closed by maintaining the accelerator depressed.

The current flowing from the primary winding 24 to the breaker switch 164 is thus appreciably reduced. In fact, it is so reduced as to disable the distributor 30 and cut the ignition system out of operation.

The disabling of the ignition system, of course, renders the internal-combustion engine inoperative as a source of power, thereby reversing the driving torque. In other words, the moving vehicle then drives the driven shaft of the transmission 10 and the driving shaft of said transmission slows down due to cutting the engine out of operation. This operation, that is, the operation of rendering the engine inoperative, facilitates the operation of demeshing the gear teeth establishing the high gear setting of the transmission, for the latter teeth are no longer being forced into driving contact with each other. If, through faulty construction or normal wear of the transmission, the parts are so constructed and arranged as to fail to effect the aforementioned operation, resulting in an initiation of this demeshing operation slightly before or after the switch 18 is closed, the presence of the fluid clutch, a yieldable connection, will facilitate this demeshing operation. It also follows that if, instead of the change-gear transmission 10, some other type of transmission is used, disabling the internal-combustion engine and reversing the driving torque will facilitate an uncoupling operation of the driving and driven elements of said transmission; and such a disabling operation will facilitate a demeshing of the gears even though the fluid clutch be omitted and the connection of the engine with the transmission be effected only by a manually operated clutch.

Continuing the description of the cycle of operations effected by the spring 52, as the diaphragm moves to the right the construction and arrangement of the parts including the length of the recess 174 is such that the switch 18 remains closed to effect a disabling of the engine until the operation of meshing the gear teeth of the transmission to place the same in low gear is initiated. If the transmission is provided with a so-called synchronizing mechanism the parts may be so constructed and arranged as to maintain a closing of the switch 18 until the synchronizing mechanism has completed its operation. The switch 18 is then again opened when the full bodied portion 168 of the rod 46 contacts the member 74 and this reopening of the switch results in restoring the ignition system to operation. Accordingly, the operation of the engine is resumed at the same time or substantially the same time that the transmission 10 is being meshed in high gear. This is, however, exactly the operation desired, for speeding up the engine obviates the undesirable deceleration or surge of the vehicle that would result if a vehicle picked up the load of a dead engine.

The function of the recess 174 is to be particularly stressed, for by virtue of this recess the initiation of the ignition interruption operation is delayed until the slack in the system is taken up, and the above-described demeshing operation is initiated. This delay results in reducing the length of time during which the ignition is interrupted. It is, of course, desirable to make this period of interruption just as short as possible, for otherwise the intake and exhaust manifolds of the engine may fill up with unburnt combustible gas, which will result in a back fire when the operation of the ignition system is resumed. The recess 174 may be omitted and the same result obtained by positioning a recess anywhere in the force transmitting linkage interconnecting the diaphragm 40 and the transmission. In this case the switch 18 would, of course, be positioned adjacent the slot.

Completing the description of the operation of the mechanism constituting my invention, after placing the transmission 10 in low gear by depressing the accelerator to its wide open throttle position, the driver will probably keep the accelerator in this position until the vehicle has reached the top of the hill. If this operation is effected on level ground, the driver will probably maintain the accelerator depressed until the desired vehicle speed is obtained. Upon releasing the accelerator, the transmission will remain in low gear, as previously described, until the accelerator is released sufficiently to again energize the motor 41 to effect a high gear setting of the transmission. When bringing the vehicle to a stop the governor 14 will open the switch 148 and close the switch 146 to effect a low gear setting of the transmission, this operation taking place at a relatively low vehicle speed, depending, of course, upon the setting of the governor and the switch mechanism operated thereby.

Briefly describing this operation, the electrical circuit to the valve operating solenoids 50 and 56 is broken when the switch 148 is opened and an electrical circuit including the interrupter switch 18 is completed via the closed governor operated switch 146 which is grounded. The motor 41 is then automatically again energized by the spring 52 to place the transmission 10 in low gear and the ignition is successively interrupted and its operation resumed, all as previously described.

There is thus provided, by my invention, a simple and compact spring and presure differential operated motor unit constituting a part of the accelerator and governor controlled transmision operating kickdown mechanism of the day; for the electromagnet 50, operative to hold the power element of the motor 41 in its up-shift position, simplifies the construction of the unit as does the electromagnet 56 mounted in the central portion of the unit and operative to operate the control valve of said unit.

Although this invention has been described in connection with a certain specific embodiment the principles involved are susceptible of numerous other applications that will readily occur to to persons skilled in the art. My invention is, therefore, to be limited only as indicated by the scope of the appended claims.

I claim:

1. A spring and pressure differential operated motor unit including a motor constituting one section of the unit, a three-way valve for controlling the operation of the motor, electromagnetic means for operating said valve and other electromagnetic means, housed in an end portion of said unit, for holding the power element of the motor unit in one of its operative positions.

2. A spring and pressure differential operated motor unit comprising a multi-sectioned casing housing a motor in one end of said casing, a three-way valve for controlling the operation of the motor, an electromagnet, including an armature connected with the power element of the aforementioned motor, mounted in the casing and serving, when energized, to hold the power element of the motor in one of its operative positions, another electromagnet mounted in the casing and constituting a part of the means for operating the aforementioned control valve; and electrical control means also mounted in the casing, the operation of said control means being controlled by the movement of the aforementioned armature.

HAROLD W. PRICE.

REFERENCES CITED

The following references are of record in the file of this patent:

UNITED STATES PATENTS

| Number | Name | Date |
|---|---|---|
| 1,836,813 | Rankin | Dec. 15, 1931 |
| 2,267,464 | Iavelli | Dec. 23, 1941 |
| 2,279,365 | Cameron | Apr. 14, 1942 |